United States Patent [19]
DiPaola

[11] Patent Number: 5,417,463
[45] Date of Patent: May 23, 1995

[54] BAKER'S PEEL

[76] Inventor: Steven DiPaola, 11431 W. Oakland Park Blvd., Sunrise, Fla. 33351

[21] Appl. No.: 188,568

[22] Filed: Jan. 28, 1994

[51] Int. Cl.⁶ .............................................. A47J 43/28
[52] U.S. Cl. ............................................ 294/7; 294/49
[58] Field of Search ................... 294/7, 8, 32, 49, 50, 294/54.5, 56, 59, 64.1, 64.3

[56] References Cited

U.S. PATENT DOCUMENTS

| | | | |
|---|---|---|---|
| 1,075,459 | 10/1913 | Bowman | 294/49 |
| 1,431,702 | 10/1922 | Smend et al. | 294/64.1 X |
| 1,747,258 | 2/1930 | O'Neil | 294/49 |
| 2,070,928 | 2/1937 | Schroeder | 294/49 |
| 2,193,341 | 3/1940 | Mehringer | 294/7 |
| 2,996,111 | 8/1961 | Mocerino et al. | 294/49 X |
| 3,525,339 | 8/1970 | Halligan . | |
| 5,213,384 | 5/1993 | Baker . | |

FOREIGN PATENT DOCUMENTS

| | | | |
|---|---|---|---|
| 3374 | 11/1872 | United Kingdom | 294/49 |
| 423424 | 9/1974 | U.S.S.R. | 294/49 |

*Primary Examiner*—Dean J. Kramer
*Attorney, Agent, or Firm*—Herbert L. Lerner; Laurence A. Greenberg

[57] ABSTRACT

An improved baker's peel of the type with a rigid, flat spatula and a handle has openings formed in the top surface of the spatula. The openings communicate with a conduit extending in the spatula and through the handle. A pump mechanism may be provided at the end of the conduit at the distal end of the handle, so that a gas such as air may be pumped through the conduit and out of the openings on the spatula.

2 Claims, 5 Drawing Sheets

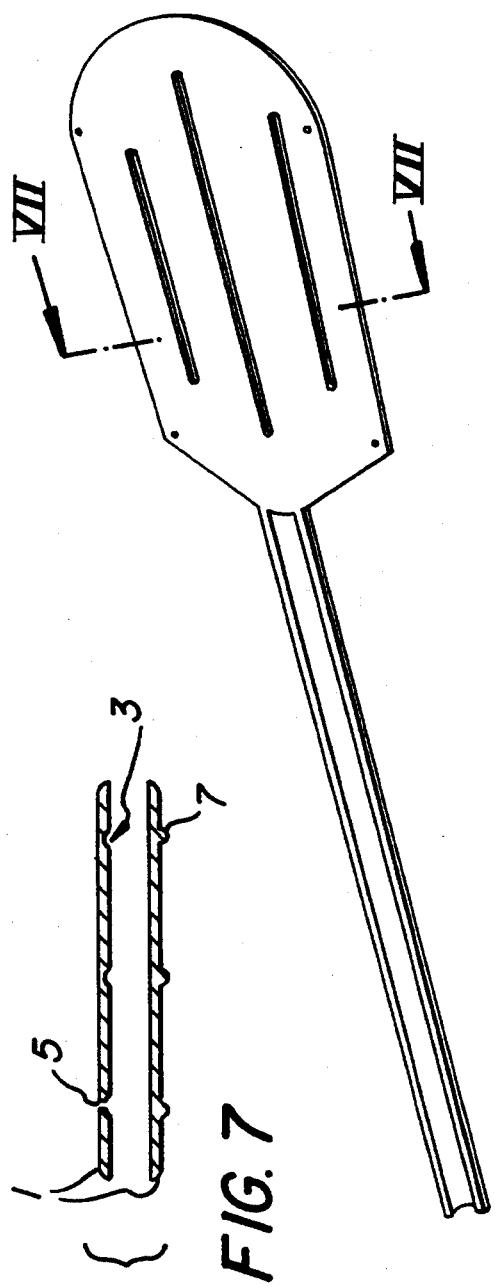
FIG. 5
FIG. 7
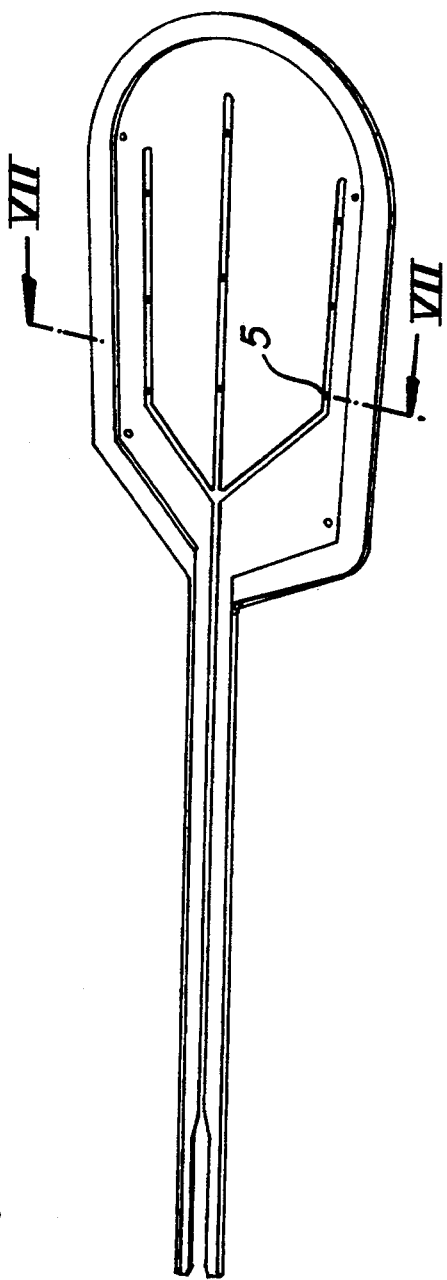
FIG. 6

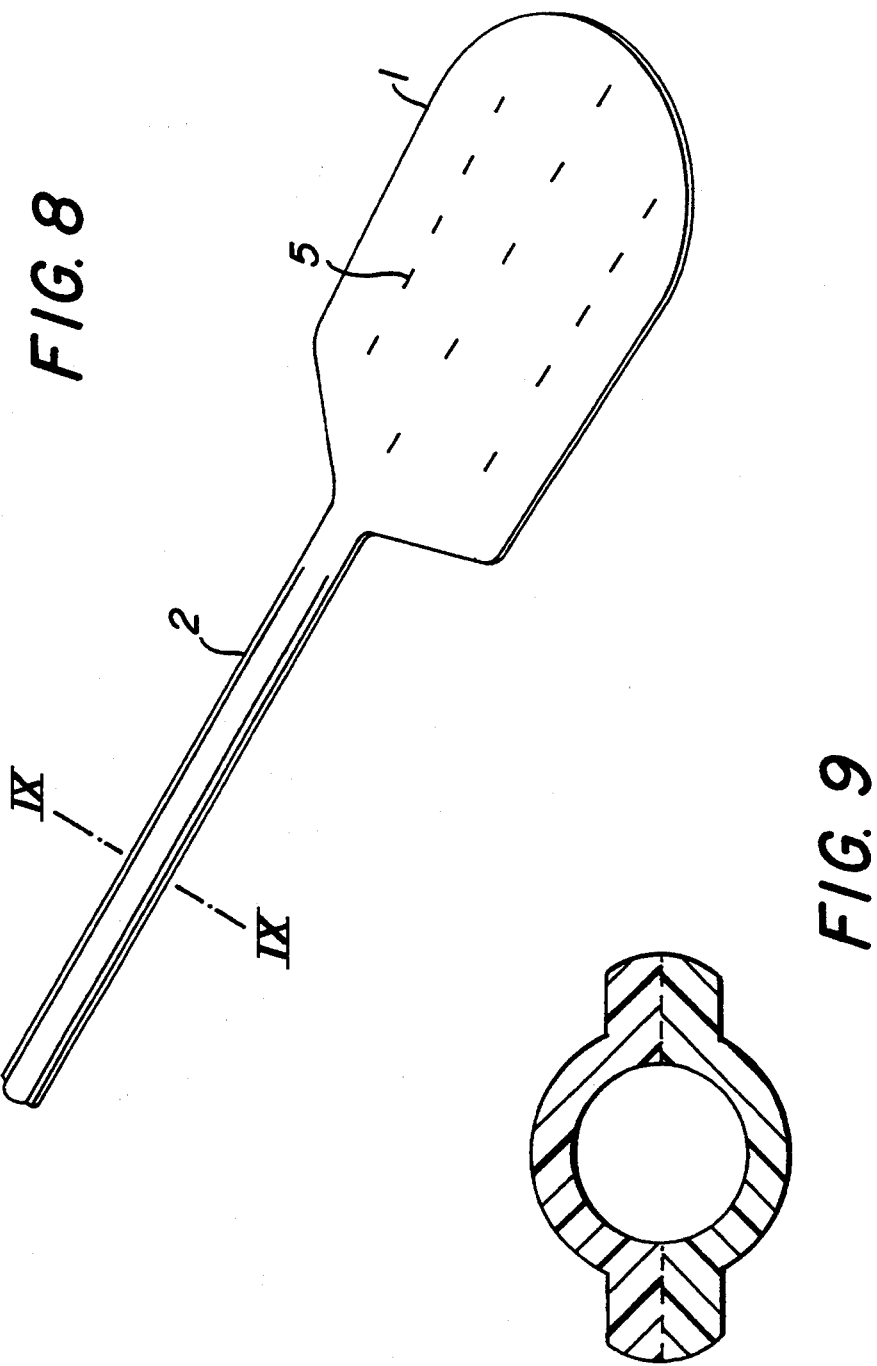

BAKER'S PEEL

BACKGROUND OF THE INVENTION

1. Field of the Invention

The invention relates to a baker's peel and particularly to a pizza peel.

2. Description of the Related Art

Conventional baker's peels are basically large wooden spatulas with a flat plate. The bakery product or pizza is placed on the plate and pushed into the oven cavity for cooking. Very often the dough sticks to the support surface of the wooden peel. It is then necessary to peel the dough from the peel with an additional utensil or, as often observed in pizzerias, the pizza cook slightly lifts the pizza dough from the peel and blows under it. Another disadvantage of the prior art wooden peel is its tendency to warp when it is exposed to extreme heat for too long or when it is soaked for too long in a cleaning solution. As the conventional wooden peels are quite expensive, it adds to a considerable loss when the warped peel must be thrown away.

A recent advance in the art is disclosed in U.S. Pat. No. 5,213,384 to Baker. The patent discloses a metal plate with a wooden handle. The metal plate provided by Baker provides a number of advantages over the prior art, as for instance improved warp-resistance and easier handling in terms of sanitary requirements. The Baker plate, however, is not improved with respect to the tendency of the dough to stick to the support surface. Additionally, it has been found in recent studies that the biological retention capacity of wood, i.e. the likelihood that germs will be retained and bacteria will grow in wooden plates, is considerably lower than with metal utensils.

SUMMARY OF THE INVENTION

It is accordingly an object of the invention to provide a baker's peel, which overcomes the hereinafore-mentioned disadvantages of the heretofore-known devices of this general type and which allows pizzas and bakery products which would otherwise stick to the support surface to be removed therefrom easily and without additional utensils.

With the foregoing and other objects in view there is provided, in accordance with the invention, a baker's peel, comprising:

a rigid plate having a support surface for supporting bakery products thereon, and a handle portion attached to the plate;

the support surface having a plurality of openings formed therein and the handle portion and the rigid plate having a conduit formed therein communicating with the openings.

In accordance with another feature of the invention, the baker's peel includes pump means disposed at the handle portion and communicating with the conduit for pumping a gas through the conduit and through the openings. Usually the gas may be air, but other inert and non-combustible gases may be used as well.

In accordance with other features of the invention, the plate and the handle portion are formed of plastic, wood, metal or combinations thereof.

In other words, the invention pertains to an improved baker's peel of the type having a handle rigidly attached to a substantially flat spatula and the spatula having a support surface for transporting bakery products into and out of baking ovens. The improvement comprises a conduit formed through the handle and into the flat spatula and communicating with openings formed in the support surface of the spatula.

Other features which are considered as characteristic for the invention are set forth in the appended claims.

Although the invention is illustrated and described herein as embodied in a baker's peel, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIGS. 5 and 6 are perspective views of mating bottom and top halves, respectively;

FIG. 7 is a cross-section taken along the line VII—VII of FIGS. 5 and 6;

FIG. 8 is a top-perspective view of an assembled baker's peel according to the invention; and FIG. 9 is a cross-sectional view taken along the line IX—IX of FIG. 8.

DESCRIPTION OF THE PREFERRED EMBODIMENTS

Figure 1:
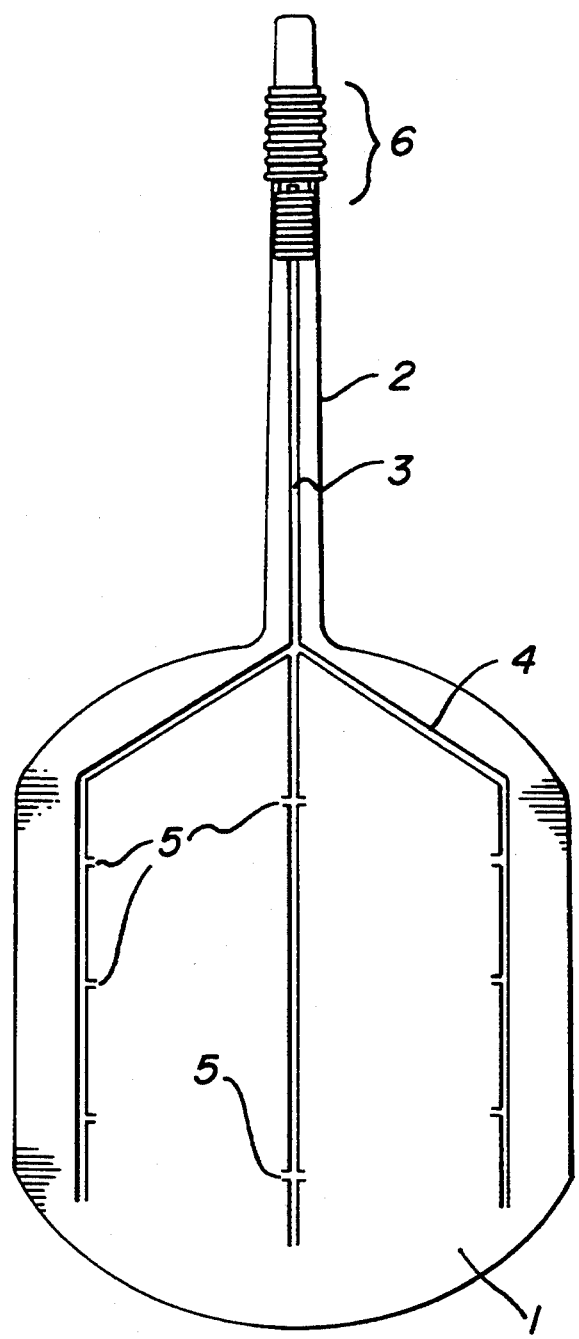
FIG. 1 is a diagrammatic top-plan view of a peel according to the invention.

Referring now to the figures of the drawing in detail and first, particularly, to FIG. 1 thereof, there is seen a spatula or peel plate 1 and a handle portion 2. A pneumatic conduit 3 extends through the handle portion 2 and communicates with conduits 4 provided in the peel plate 1. A plurality of openings 5 are formed in the support surface of the peel plate 1 for the release of a gas, and particularly air, from the pneumatic conduits. A pump 6 is provided at the distal end of the handle portion 2. The pump 6 should be of the type which releases air but does not aspirate air through the conduit 3, similar to a bicycle pump.

In another embodiment, the pump 6 is replaced with a mouthpiece issuing into a blow hole. Instead of actuating a pump, the cook may simply blow into a mouthpiece provided at the blow hole.

Figure 2:
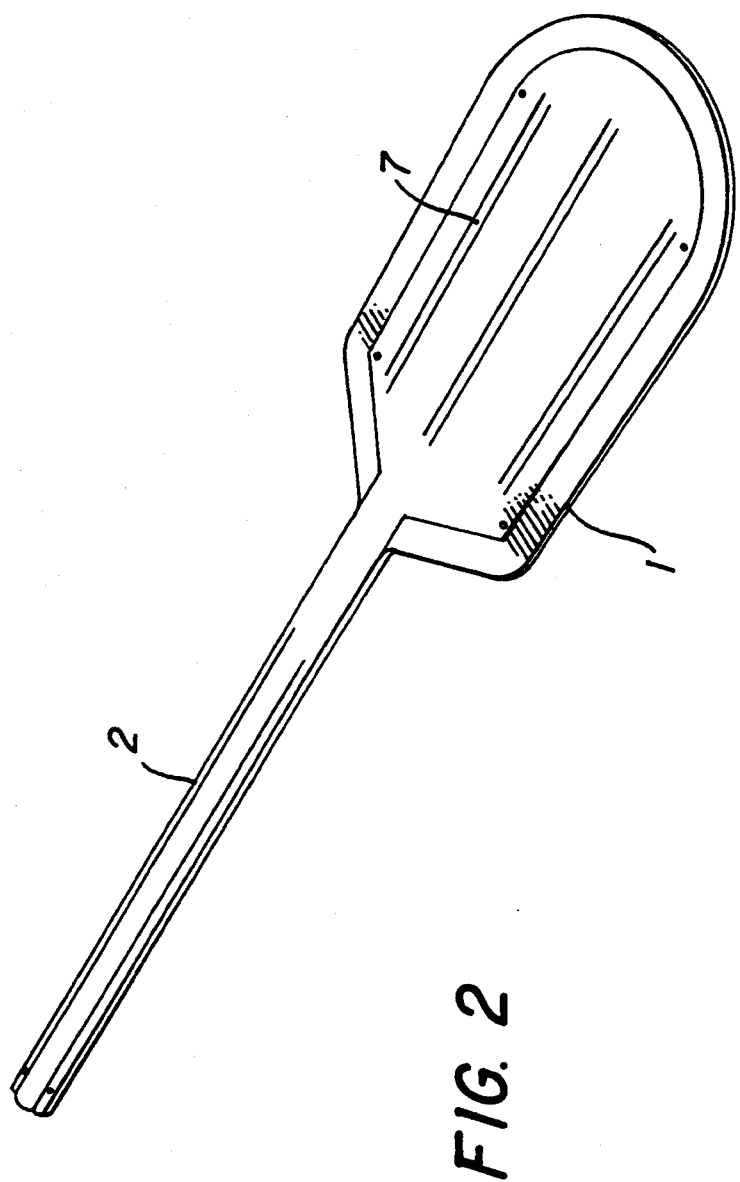
FIG. 2 is a bottom-perspective view of the peel.

With reference to FIG. 2, ridges 7 are formed on the bottom surface of the plate 1. The ridges 7 are provided so that the peel may rest on a hot surface with a minimum of heat exchange and, additionally, for reinforcement against bending.

Figures 3, 4:
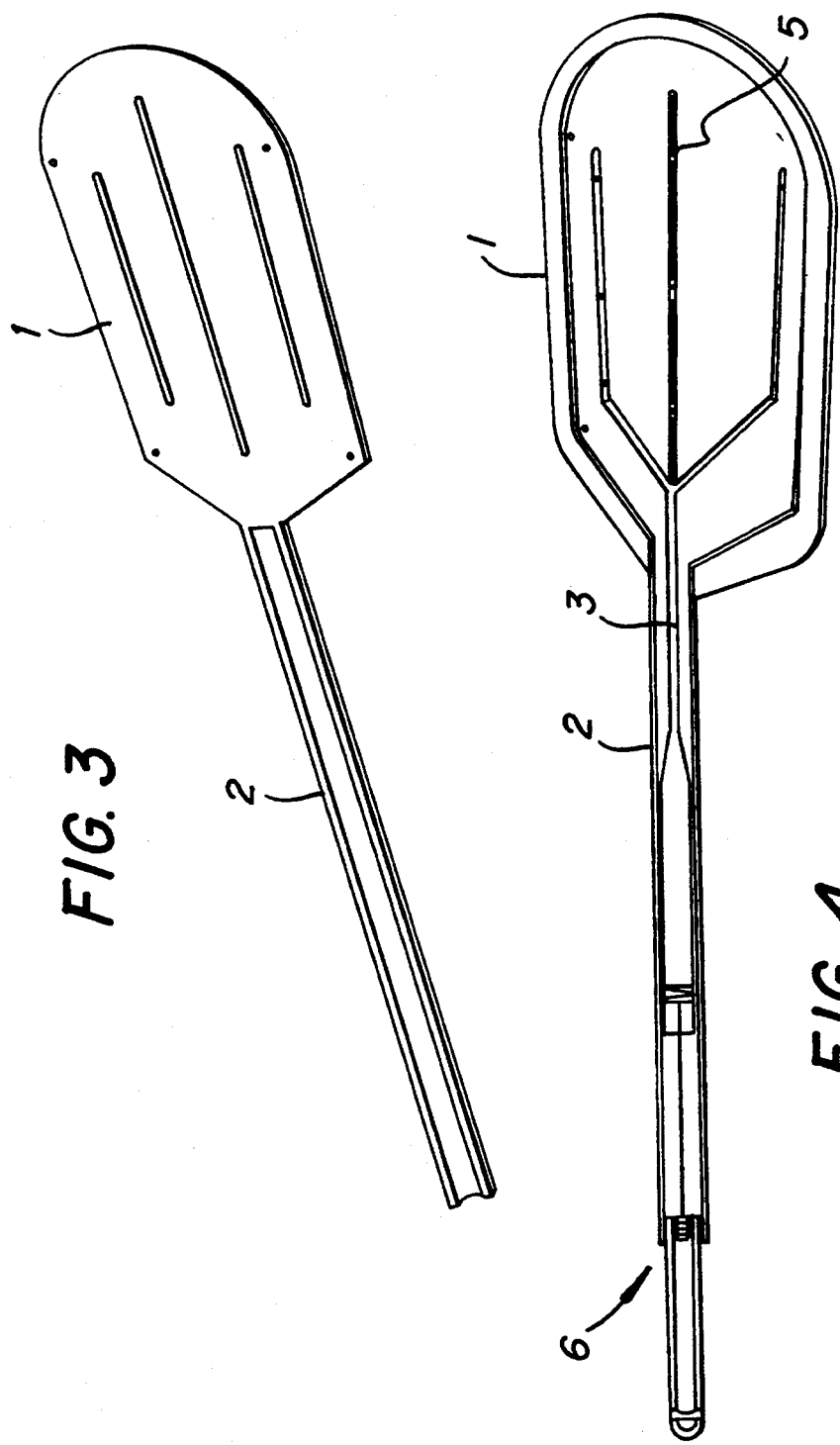
FIG. 3 is a perspective view of one half of the peel.
FIG. 4 is a perspective view of a top half of the peel showing an exemplary pump mechanism.

With reference to FIGS. 3 and 4, the baker's peel of the invention may be formed of two matching halves. This is particularly advantageous if the peel is made from wood. In that case, the conduit 3 may simply be routered into one of the mating surfaces and the openings 5 may then be drilled into the surface so as to issue into the routered grooves. When the two halves shown in FIGS. 5 and 6, respectively, and again in FIG. 7, are sandwiched together, the grooves 3 become the conduits 3.

As shown in the perspective view of FIG. 8, the top surface of the spatula 1 may be provided with any number of slits 5 or oblong holes. This is particularly possible in the context of molded plastic peels.

The top and bottom halves of the baker's peel may be connected in several ways. In the case of plastic peels, the halves may be fused to one another. It is also possible, of course, to mold the plastic peels in a single mold and providing it with the openings 5 and the conduits 3 during the molding process.

I claim:

1. In a baker's peel of the type having a handle rigidly attached to a substantially flat spatula and the spatula having a substantially flat support surface for transporting bakery products into and out of baking ovens, the improvement which comprises a conduit formed through the handle and into the flat spatula and communicating with openings formed in and distributed throughout the support surface of the spatula.

2. The improved baker's peel according to claim 1, including pump means disposed at said handle portion and communicating with said conduit for pumping a gas through said conduit and through said openings.

* * * * *